(12) United States Patent
Zhou et al.

(10) Patent No.: US 7,990,690 B2
(45) Date of Patent: *Aug. 2, 2011

(54) ELECTRONIC DEVICE HAVING A TRANSPARENT AREA

(75) Inventors: Jia-Gui Zhou, Shenzhen (CN); Cheng-Hao Chou, Taipei Hsien (TW); Qiu-Chun Zhao, Shenzhen (CN); Ming-Tesung Cheng, Taipei Hsien (TW); Kuan-Hong Hsieh, Taipei Hsien (TW); Han-Che Wang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 93 days.

This patent is subject to a terminal disclaimer.

(21) Appl. No.: 12/542,718

(22) Filed: Aug. 18, 2009

(65) Prior Publication Data

US 2010/0226077 A1 Sep. 9, 2010

(30) Foreign Application Priority Data

Mar. 9, 2009 (CN) ...................... 2009 2 0301153 U

(51) Int. Cl.
*G06F 1/16* (2006.01)

(52) U.S. Cl. ................................................ 361/679.01
(58) Field of Classification Search ............. 361/679.01
See application file for complete search history.

(56) References Cited

U.S. PATENT DOCUMENTS

| | | | | |
|---|---|---|---|---|
| 7,466,540 | B2 * | 12/2008 | Takahashi et al. | 361/679.27 |
| 7,576,975 | B2 * | 8/2009 | Tai et al. | 361/679.21 |
| 7,733,642 | B2 * | 6/2010 | Liou et al. | 361/679.41 |
| 2004/0042160 | A1 * | 3/2004 | Yang et al. | 361/681 |
| 2007/0247793 | A1 * | 10/2007 | Carnevali | 361/681 |
| 2008/0123269 | A1 * | 5/2008 | Tsai et al. | 361/681 |
| 2009/0147155 | A1 * | 6/2009 | Hsu et al. | 348/836 |
| 2009/0316056 | A1 * | 12/2009 | Rosencwaig et al. | 348/836 |
| 2010/0020260 | A1 * | 1/2010 | Hsu et al. | 349/58 |
| 2010/0226105 | A1 * | 9/2010 | Zhou et al. | 361/752 |

* cited by examiner

*Primary Examiner* — Lisa Lea-Edmonds
(74) *Attorney, Agent, or Firm* — Zhigang Ma

(57) ABSTRACT

An electronic device includes a display unit and a housing receiving the display unit. The display unit includes a display panel, a display cover for receiving the display panel, a transparent board for securing the display panel in the display cover, and a transparent frame placed over the display cover. The housing includes a front cover and a back cover coupled to the front cover. The front cover and the back cover respectively define openings aligned with the display unit. The transparent board and the transparent frame each has a size slightly larger than the openings of the front cover and the back cover, and the display panel and the display cover each has a size smaller than the openings of the front cover and the back cover. The electronic device looks like floating in the air.

6 Claims, 3 Drawing Sheets

ELECTRONIC DEVICE HAVING A TRANSPARENT AREA

BACKGROUND

1. Technical Field

The present disclosure relates to a consumer electronic device having a transparent area.

2. Description of Related Art

Appearance of consumer electronic devices plays a very important part in attracting consumers.

What is needed is an electronic device with a new and unique appearance.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
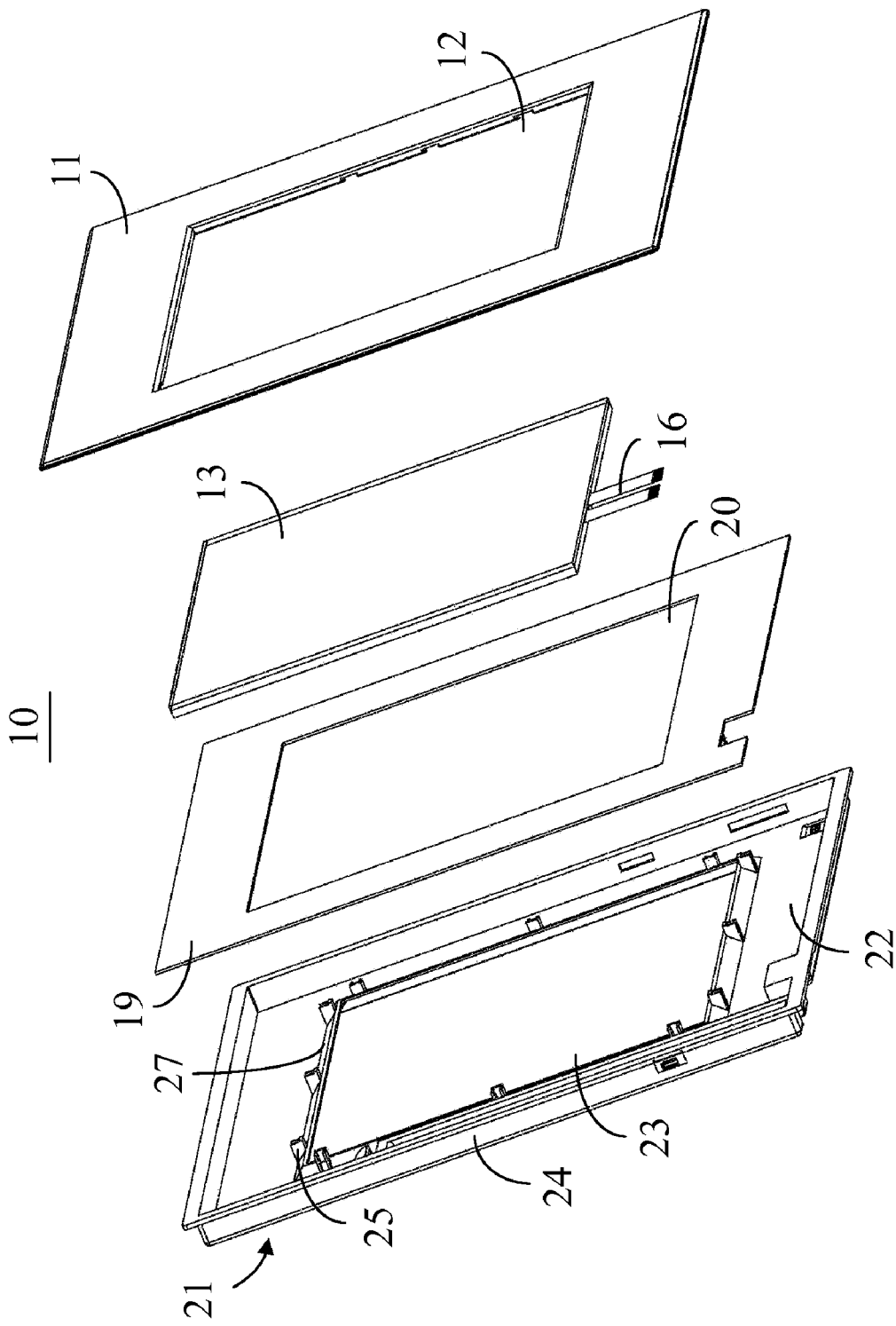
FIG. 1 is a schematic, exploded view of an electronic device according to an exemplary embodiment.

Referring to FIG. 1, an electronic device 10 according to an exemplary embodiment is disclosed. The electronic device 10 can be a digital photo frame, a personal digital assistant, a liquid crystal display televisions, or the like. The electronic device 10 includes a housing including a front cover 11 and a back cover 21 coupled to the front cover 11. The housing receives a display unit 13 and a printed circuit board (PCB) 19.

The front cover 11 and the back cover 21 are opaque. The front cover 11 and the back cover 21 respectively define openings 12, 23 corresponding to the display unit 13, so that the display unit 13 is visible from outside the housing.

The back cover 21 includes a bottom 22 and an outer wall 24 extending upwardly from a periphery of the bottom 22. The opening 23 is defined in the bottom 22. The back cover 21 further includes an inner wall 27 extending upwardly from the bottom 22 and surrounding the opening 23. The inner wall 27 has a much lower height than the outer wall 24. A plurality of limit pins 25 extends from the bottom 22 adjacent to the inner wall 27. The limit pins 25 are taller than the inner wall 27.

Figure 2:
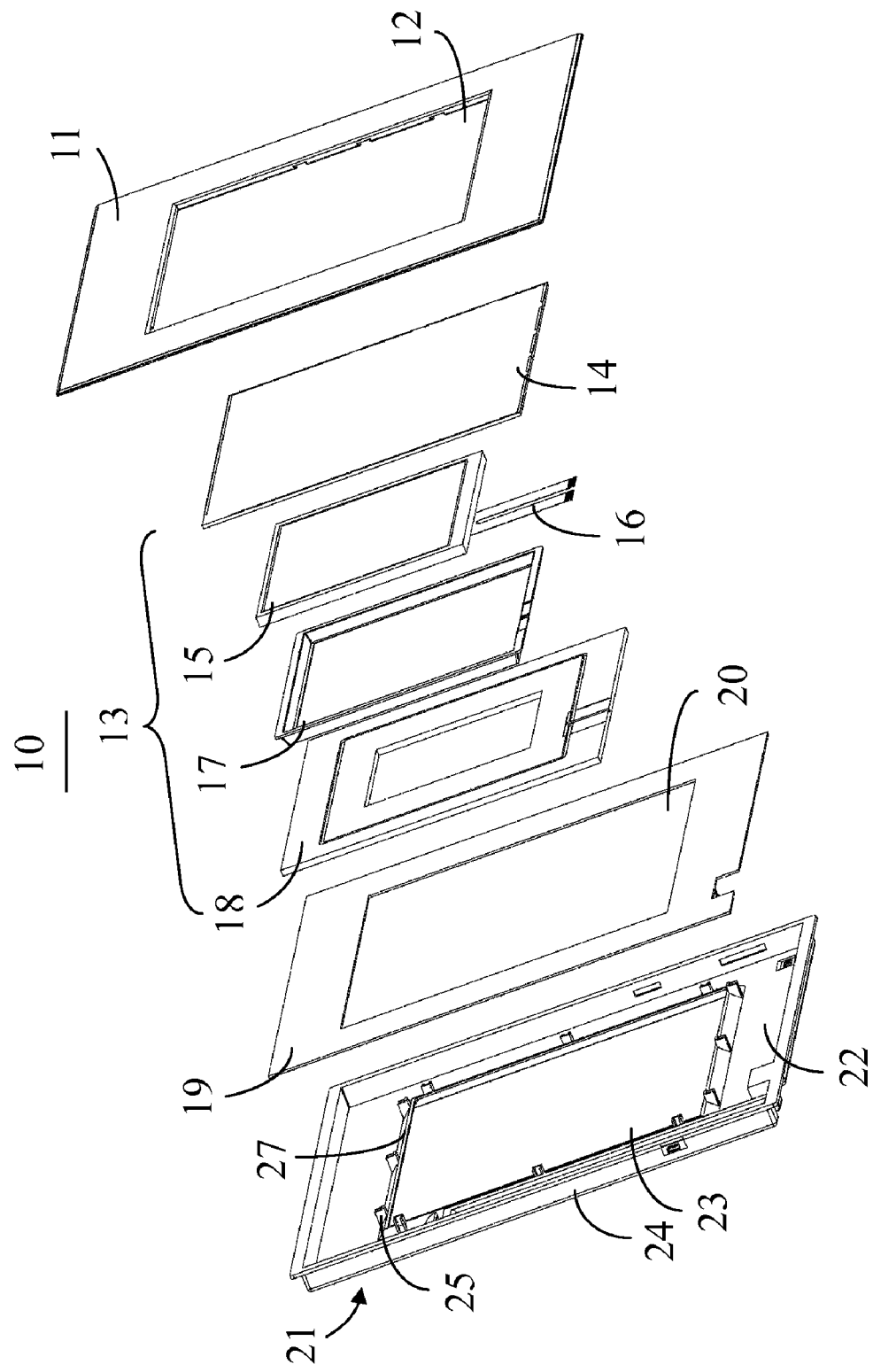
FIG. 2 is another schematic, exploded view of the electronic device of FIG. 1.

Referring to FIG. 2, the display unit 13 includes a transparent board 14, a display panel 15, a display cover 17 and a transparent frame 18. The transparent board 14 and the transparent frame 18 are slightly larger than the openings 12, 23 of the front cover 11 and the back cover 21. The display panel 15 and the display cover 17 are smaller than the openings 12, 23 of the front cover 11 and the back cover 21. The display panel 15 includes a transparent cable 16 configured for connecting the display panel 15 to the PCB 19. The display cover 17 receives the display panel 15. The transparent board 14 keeps the display panel 15 in the display cover 17. The transparent frame 18 is secured over the display cover 17. The display panel 15, the display cover 17, and the transparent frame 18 can be assembled by appropriate means, such as with glue or screws.

The PCB 19 defines an opening 20 in the PCB 19. The opening 20 is larger than the display unit 13.

In assembly, firstly, the back cover 21 is placed on a surface with the outer wall 24 and the inner wall 27 facing upwards. Then, the PCB 19 is laid on the bottom 22 between the outer wall 24 and the inner wall 27. Next, the display unit 13 is put on the inner wall 27 and is secured among the limit pins 25. Then, the transparent cable 16 is connected to the PCB 19. At last, the front cover 11 is assembled to the back cover 21 by appropriate means, such as with screw type fasteners. In this way, the electronic device 10 is assembled.

The PCB 19 and the display unit 13 can be further secured in the housing by other connecting means, such as with screw type fasteners. The PCB 19 can also be mounted in the display cover 17 instead of surrounding the display unit 13.

Figure 3:
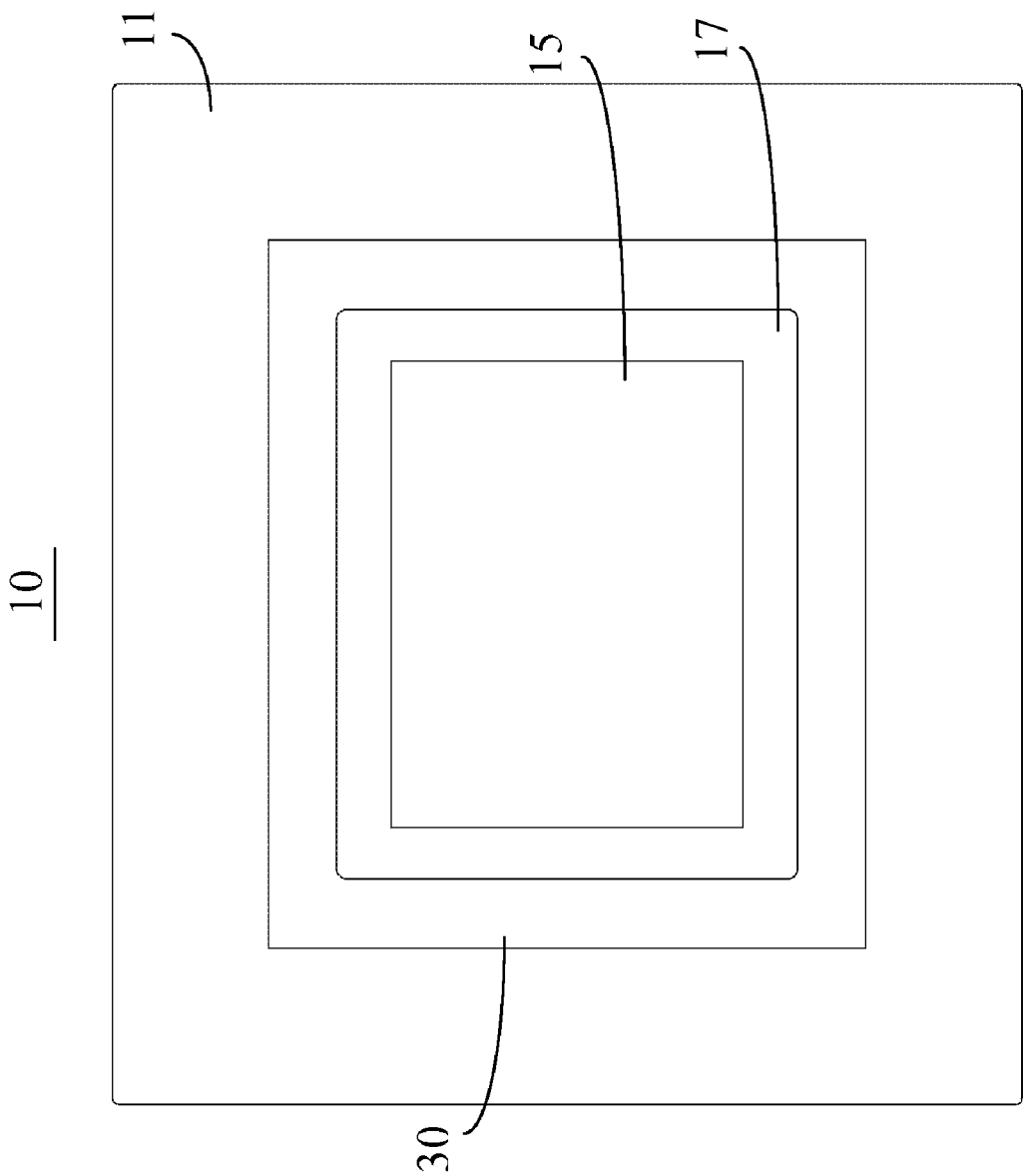
FIG. 3 is a schematic, front view of the electronic device of FIG. 1, showing the appearance of the electronic device.

Referring to FIG. 3, the electronic device 10 includes a transparent area 30 formed by the cooperation of the openings 12, 23, the transparent board 14, and the transparent frame 18. The transparent area 30 is positioned between the front cover 11 and the display cover 17. Thus, it appears that the display unit 13 is floating in the air.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device having a transparent area, the electronic device comprising:
    a display unit comprising a display panel, a display cover for receiving the display panel, a transparent board for securing the display panel in the display cover, and a transparent frame placed over the display cover; and
    a housing receiving the display unit, comprising a front cover and a back cover coupled to the front cover, wherein the front cover and the back cover respectively define openings aligned with the display unit,
    wherein the transparent board and the transparent frame each has a size slightly larger than the openings of the front cover and the back cover, and the display panel and the display cover each has a size smaller than the openings of the front cover and the back cover.

2. The electronic device of claim 1, further comprising a printed circuit board received in the housing, connected to the display unit.

3. The electronic device of claim 2, further comprising a transparent cable for connecting the display panel to the printed circuit board.

4. The electronic device of claim 1, wherein the back cover comprises a bottom and an outer wall extending from a periphery of the bottom, the opening of the back cover is defined in the bottom, and the back cover further comprises an inner wall extending from the bottom and surrounding the opening.

5. The electronic device of claim 4, wherein the printed circuit board is positioned between the outer wall and the inner wall.

6. The electronic device of claim 4, further comprising limit pins extending adjacent to the inner wall for securing the display unit on the back cover.

* * * * *